United States Patent [19]

Tapley

[11] Patent Number: 4,947,574
[45] Date of Patent: Aug. 14, 1990

[54] SPRING LOADED FISH HOOK ASSEMBLY

[76] Inventor: William Tapley, Woodhull St., Forestport, N.Y. 13338

[21] Appl. No.: 447,569

[22] Filed: Dec. 7, 1989

[51] Int. Cl.$^5$ .............................................. A01K 83/02
[52] U.S. Cl. ...................................................... 43/36
[58] Field of Search ............... 43/34, 35, 36, 37, 42.13

[56] References Cited

U.S. PATENT DOCUMENTS

| 684,211 | 10/1901 | Ferch | 43/36 |
| 2,982,047 | 5/1961 | Wilshusen | 43/36 |
| 4,718,191 | 1/1988 | Gentry | 43/42.13 |
| 4,726,142 | 2/1988 | Tapley | 43/36 |

FOREIGN PATENT DOCUMENTS 0474480  9/1952  Italy ........................................ 43/35

Primary Examiner—Richard K. Seidel
Assistant Examiner—James Miner
Attorney, Agent, or Firm—Charles S. McGuire

[57] ABSTRACT

A spring-loaded, double acting fish hook assembly having a single strand of spring wire bent to provide two legs extending from the bend to respective terminal ends. A pair of essentially conventional, banked fish hooks are fixedly attached to the terminal ends of the legs, one of which is further bent in a 360° loop to provide a torsion spring, by first and second connecting members. One of the connecting members also serves as a pivotal mounting for a catch and trigger mechanism, and the other connecting member provides a latch for the catch arm of the catch and trigger mechanism. A perforated spinner blade is preferably mounted on the legs other than that having the 360° loop for rotation as the lure moves through the water.

10 Claims, 1 Drawing Sheet

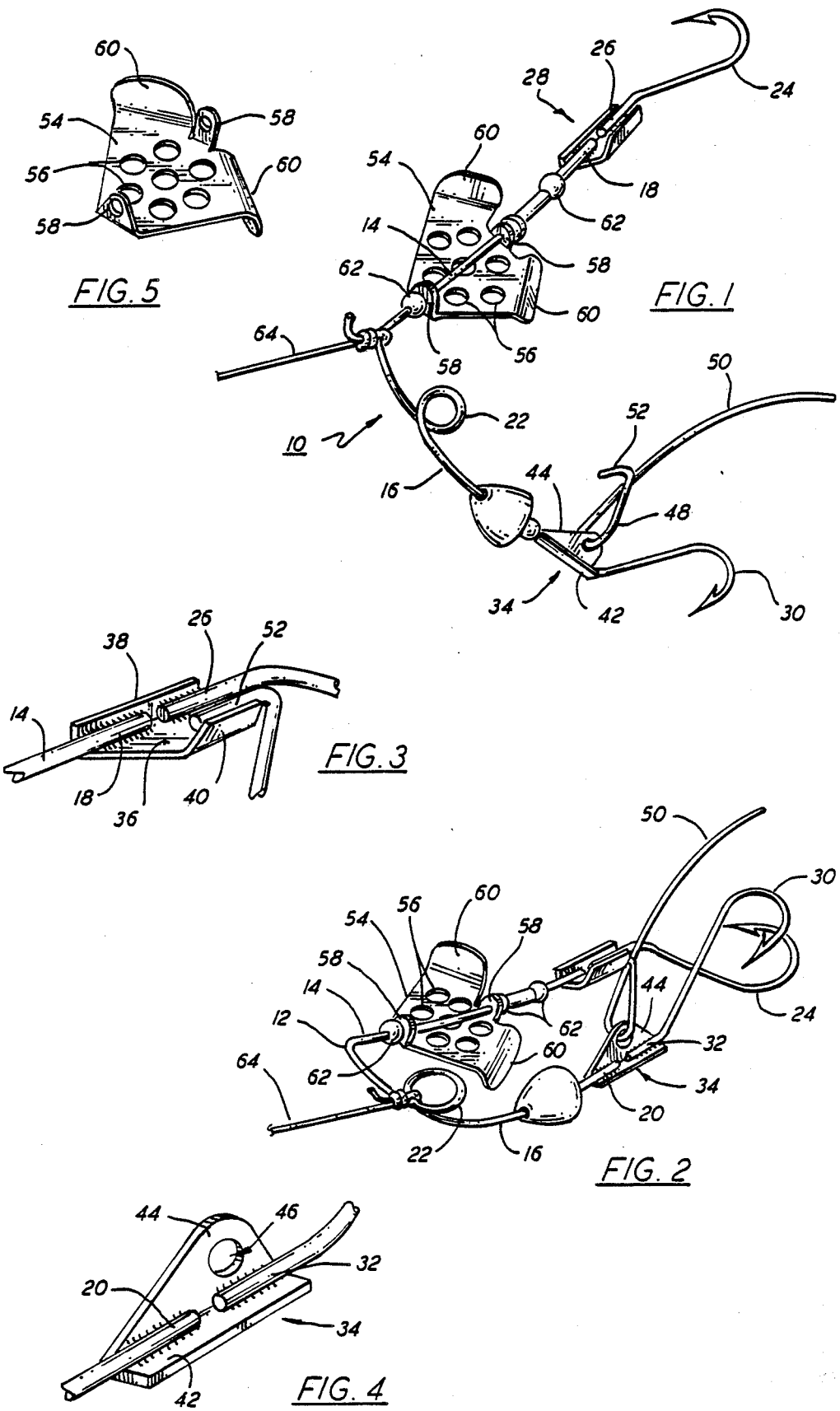

SPRING LOADED FISH HOOK ASSEMBLY

BACKGROUND OF THE INVENTION

The present invention relates to latching, spring loaded, double-acting fish hook assemblies and, more specifically to novel and improved features of the spring loaded fish hook assembly of my prior U.S. Pat. No. 4,726,142.

Examples of prior fish hook assemblies having a pair of hooks movable under the biasing force of a spring from a closed or set position to an open position in response to a fish striking the lure are cited and discussed in my above-mentioned patent. Although the particular hook assembly of my prior patent provides an effective double-acting hook, a number of improved features have been devised which enhance both the operation and fabrication of the assembly.

One of the objects of the present invention is to provide a double acting hook assembly utilizing a pair of essentially conventional hooks respectively connected to the legs of a torsion spring by members which each serve a function in addition to that of a connecting means.

Another object is to provide a spring loaded, double acting lure having hooks fixedly attached to opposite ends of a single length of spring wire bent at a point other than its midpoint to form two legs, one of which is looped to provide a torsion spring.

A further object is to provide a hook assembly wherein a pair of hooks are respectively connected to the ends of a bent spring wire to which a line or leader may be conveniently attached at any of a plurality of positions to alter the action of the assembly in the water.

Still another object is to provide a fishing lure of the type having a pair of hooks connected to the ends of a pair of legs of a torsion spring and which may be selectively operated as a spinner bait, a buzz bait or a jig.

Other objects will in part be obvious and will in part appear hereinafter.

SUMMARY OF THE INVENTION

In furtherance of the foregoing objects, the fishing lure or hook assembly of the invention includes a pair of barbed hooks respectively attached to opposite ends of a length of spring wire which is bent to include a loop forming a torsion spring, as in my prior patent referenced above. However, in the present invention, the spring is bent at other than its midpoint to provide unequal lengths of the wire on opposite sides of the bend, with the longer side or leg being formed in a loop to provide a torsion spring. A line or leader may be attached to the assembly at a plurality of locations including those of the bend and the torsion spring loop, with the action of the lure in the water varying in accordance with the position of line or leader attachment.

Rather than forming the ends of the spring wire into barbed hooks, a pair of essentially conventional hooks are fixedly attached by respective connecting means to the wire ends. The attachment means for one of the hooks comprises a member having a surface to which each of one wire end and the shank of the hook are soldered or brazed and portion extending toward the other leg with an opening therein. The other attachment means comprises a channel-like member having an upstanding lip or flange along each side. The second wire end and hook shank are each soldered or brazed to the channel-like member at the juncture of the inner surface and one of the flanges.

As a further, optional feature, a blade is mounted upon one of the legs of the torsion spring for rotation about the axis of such leg as the lure is moved through the water. The blade is perforated and the perforations may be left open for use of the lure as a spinnerbait or covered with tape, or the like, for use as a buzzbait. The blade is preferably mounted on the shortest length of wire from the bend separating the legs, i.e., on the leg other than that having the loop providing the torsion spring.

The foregoing and other features of the novel hook assembly and lure will be more readily understood and appreciated from a consideration of the following detailed description, taken in conjunction with the accompanying drawings, wherein:

BRIEF DESCRIPTION OF THE DRAWINGS

FIG. 1 is a side elevational view of the hook assembly in a preferred embodiment in the unflexed or open position;

FIG. 2 is a side elevational view of the assembly of FIG. 1 in the flexed or "set" position;

FIGS. 3 and 4 are enlarged, fragmentary, perspective views of portions of the hook assembly of FIGS. 1 and 2; and FIG. 5 is a perspective view of a rotatable blade element of the assembly.

DETAILED DESCRIPTION

Referring now to the drawings, the fish hook assembly of the invention, denoted generally by reference numeral 10, is shown in a preferred embodiment wherein a single strand of spring wire is bent at a position 12 other than at its midpoint to provide a pair of legs 14 and 16 of unequal length on opposite sides of the bend. Legs 14 and 16 extend from bend 12 to respective terminal ends 18 and 20. Leg 16 is further bent at a position between bend 12 and its terminal end 20 to form a 360° loop 22, providing a torsion spring having unflexed and flexed positions, shown in FIGS. 1 and 2, respectively.

An essentially conventional, barbed fish hook 24, having shank portion 26, is fixedly attached to terminal end 18 of leg 14 by means of attachment member 28. Hook 30, having shank portion 32, is likewise attached by member 34 to terminal end 20 of leg 16. As best seen in FIG. 3, attachment member 28 is of channel-like configuration, having essentially plane or surface 36 lying between upstanding flanges 38 and 40. A portion of leg 14 extending from and including terminal end 18 and shank portion 26 are each placed in contact with attachment member 28 at the juncture of surface 36 and flange 38 and soldered or brazed thereto, thus permanently attaching hook 24 and leg 14. As best seen in FIG. 4, attachment member 34 includes base portion 42 and tab 44, the latter having opening 46 therein. Base 42 and tab 44 are arranged to provide angularly disposed, internal surfaces at the juncture of the two portions. Terminal end 20 and shank portion 32 are placed upon attachment member 34 to extend along the juncture of the adjoining, internal surfaces and soldered or brazed thereto, as shown in FIG. 4.

A catch and trigger mechanism for assembly 10 is formed from a single strand of stiff wire bent to form loop 48, passing loosely through opening 46, with curved trigger arm 50 and catch arm 52 extending from loop 48 to opposite, terminal ends of the wire. In order to place assembly 10 in the "set" position, legs 14 and 16 are moved from the position of FIG. 1 toward one another, against the biasing force of the torsion spring formed by loop 22. Catch arm 52 is placed against surface 36 of attachment member 28 and is urged against flange 40 by the spring, which tends to move legs 14 and 16 back toward their unflexed position. The length and configuration of trigger arm 50 are such that the arm lies outwardly adjacent the curved portion of hook 30 when the assembly is in the set position. Any force exerted on trigger arm 50 in the direction of hook 30 will cause catch arm 52 to disengage from flange 40, and the torsion spring will move legs 14 and 16 back toward their unflexed positions, thereby moving hooks 24 and 30 in opposite directions. A fish striking at lure 10 or taking a bait affixed to one or both hooks, or otherwise attached to the assembly, will exert such a force on trigger arm 50, normally resulting in both hooks engaging the mouth area of the fish and accounting for the spring loaded, double-acting nature of the device.

As a further refinement, blade 54 is preferably mounted upon leg 14 for rotation as lure 10 is retrieved after casting, or is otherwise drawn through the water. As shown in FIG. 5, blade 10 is formed from a unitary piece of sheet metal, or other suitable material. Blade 54 includes a central body portion having a plurality of perforations 56 therein, apertured tabs 58 extending in the same direction from the upper and lower ends thereof, and vanes 60 extending in opposite directions on each side. Leg 14 passes through the openings in tabs 58, which are positioned between bearing means and spacers 62, whereby blade 54 is freely rotatable about the axis of leg 14. Vanes 60 provide the reactive force producting such rotation as lure 10 moves through the water.

Lure 10 may be drawn through heavy weeds or open water, and the rotation of blade 54 with open perforations 56 will produce a so-called spinnerbait action. Alternatively, perforations 56 may be covered by prism tape, or other appropriate material, and lure 10 acts as a buzzbait giving off vibrations and audible sound as it is drawn through the water at relatively high speed. The lure may, of course, be used in the manner of a jig by being retrieved slowly and erratically, with perforations 56 either open or covered. The position of the hooks in superposed relation prevents the hooks from snagging on weeds, or other foreign materials, as the lure is drawn through the water.

Line or leader 62 is tied, clipped, or otherwise attached to lure 10 either at the position of bend 12, as shown in FIG. 1, or at loop 22, as shown in FIG. 2. If line 62 is secured to lure 10 by a knot at loop 22, it should be passed around only a single position on the wire, and not the two adjacent layers of the wire at the base of the loop since flexing of the spring (loop) may loosen the knot. Lure 10 will have a different action in the water, depending upon the location of line attachment, a feature of the present lure provided by bending the wire forming the two legs to which the hooks are attached at a position other than their midpoint, and forming the torsion spring loop in one of the legs between the bend and its terminal end.

What is claimed is:

1. A latching, spring loaded, double-acting fish hook assembly comprising:

(a) a single strand of spring wire having a bend providing first and second legs extending from the bend to respective first and second terminal ends;
(b) first and second fish hooks each having a shank portion and a curved portion terminating in a sharp point;
(c) a first attachment member to which each of a portion of said first leg adjacent said first terminal end and said shank portion of said first hook are fixedly attached, thereby fixedly connecting said first leg to said first hook;
(d) a second attachment member to which each of a portion of said second leg adjacent said second terminal end and said shank portion of said second hook are fixedly attached, thereby fixedly connecting said second leg to said second hook;
(e) said wire being formed with a 360° loop to provide a torsion spring having unflexed and flexed positions wherein said first and second legs are in relatively widely and closely spaced, positions, respectively; and
(f) a unitary catch and trigger mechanism including a loop portion pivotally connecting said mechanism to one of said attachment members, a catch arm and a trigger arm extending in opposite directions from said loop portion, said mechanism and said first and second attachment members being so constructed and arranged, relative to said legs and said hooks, that when said legs are in said relatively closely spaced position said catch arm may be engaged with the other of said attachment members and said trigger arm extends in substantially parallel, spaced relation to the one of said hooks, attached to said one of said attachment means, movement of said trigger arm toward said one of said hooks releasing said catch arm from said other attachment member and permitting movement of said legs toward said relatively widely spaced position under the biasing force of said torsion spring.

2. The fish hook assembly of claim 1 wherein said other of said attachment members comprises a channel-like member having a pair of flanges along opposite edges separated by and angularly disposed with relation to an essentially planar surface.

3. The fish hook assembly of claim 2 wherein said leg terminal end and said hook shank portion are attached to said other attachment member substantially at the juncture of said planar surface with one of said flanges, and said catch arm is engageable with the other of said flanges to maintain said legs in said closely spaced relation.

4. The fish hook assembly of claim 1 wherein said first and second terminal ends, said first and second hooks and said first and second attachment members are all metal and said ends and hooks are fixedly attached to said attachment members by soldering or brazing.

5. The fish hook assembly of claim 1 wherein said second attachment member comprises a base portion having an essentially planar surface and a tab angularly disposed with respect to said surface and having a opening therein through which said loop portion of said catch and trigger mechanism loosely extends.

6. The fish hook assembly of claim 5 wherein said second terminal end and said second hook shank portion are attached to said second attachment member substantially at the juncture of said planar surface and said tab.

7. The fish hook assembly of claim 1 wherein said legs are so constructed and arranged that a line or leader may be attached thereto either at said bend or at said 360° loop.

8. The fish hook assembly of claim 1 and further including a blade mounted upon said first leg for rotation about the axis thereof as said assembly in drawn through the water.

9. The fish hook assembly of claim 8 wherein said blade includes a plurality of perforations which may be selectively left open or covered to control the action of said blade.

10. The fish hook assembly of claim 1 wherein one of said legs extends substantially straight between said bend and its terminal end, and said 360° loop is formed in the other of said legs intermediate of said bend and its terminal end.

* * * * *